(12) United States Patent
Muijs et al.

(10) Patent No.: US 6,834,235 B2
(45) Date of Patent: Dec. 21, 2004

(54) METHOD OF AND APPARATUS FOR PROCESSING SEISMIC DATA

(75) Inventors: Remco Muijs, Zurich (CH); Johan Robertsson, Oslo (NO)

(73) Assignee: WesternGeco, L.L.C., Houston, TX (US)

(*) Notice: Subject to any disclaimer, the term of this patent is extended or adjusted under 35 U.S.C. 154(b) by 0 days.

(21) Appl. No.: 10/432,829

(22) PCT Filed: Dec. 7, 2001

(86) PCT No.: PCT/IB01/02790

§ 371 (c)(1),
(2), (4) Date: Oct. 10, 2003

(87) PCT Pub. No.: WO02/46792

PCT Pub. Date: Jun. 13, 2002

(65) Prior Publication Data

US 2004/0076078 A1 Apr. 22, 2004

(30) Foreign Application Priority Data

Dec. 7, 2000 (GB) .............................................. 0029980
Jul. 4, 2001 (GB) .............................................. 0116313

(51) Int. Cl.$^7$ ................................................ G01V 1/28
(52) U.S. Cl. ........................................................ 702/14
(58) Field of Search ........................ 702/14, 17; 367/73

(56) References Cited

U.S. PATENT DOCUMENTS

| | | | |
|---|---|---|---|
| 4,922,465 A | * | 5/1990 | Pieprzak et al. ............... 367/38 |
| 4,935,903 A | * | 6/1990 | Sanders et al. ................ 367/24 |
| 4,937,793 A | * | 6/1990 | Shuck et al. .................. 367/24 |
| 5,206,837 A | * | 4/1993 | Beasley et al. ............... 367/38 |

* cited by examiner

Primary Examiner—Donald McElheny, Jr.
(74) Attorney, Agent, or Firm—Moser, Patterson & Sheridan

(57) ABSTRACT

A method of processing multi-component seismic data acquired at a receiver comprises determining a suitable decomposition scheme to use. This makes use of the existence of pairs of wavefield components that are uncoupled from one another. If there is no physical coupling between first and second wavefield components, the first and second components should not arrive at a receiver location at the same time. The method comprises decomposing a first portion, for example a test portion, of the seismic data into a plurality of wavefield components using an initial decomposition scheme. First and second wavefield components of the decomposed data that should be uncoupled from one another are then selected, and their product is determined. Since the first and second wavefield components of the decomposed data should be uncoupled from one another, their product should be zero or close to zero and a product that is significantly different from zero indicates that the decomposition scheme is inaccurate.

29 Claims, 5 Drawing Sheets

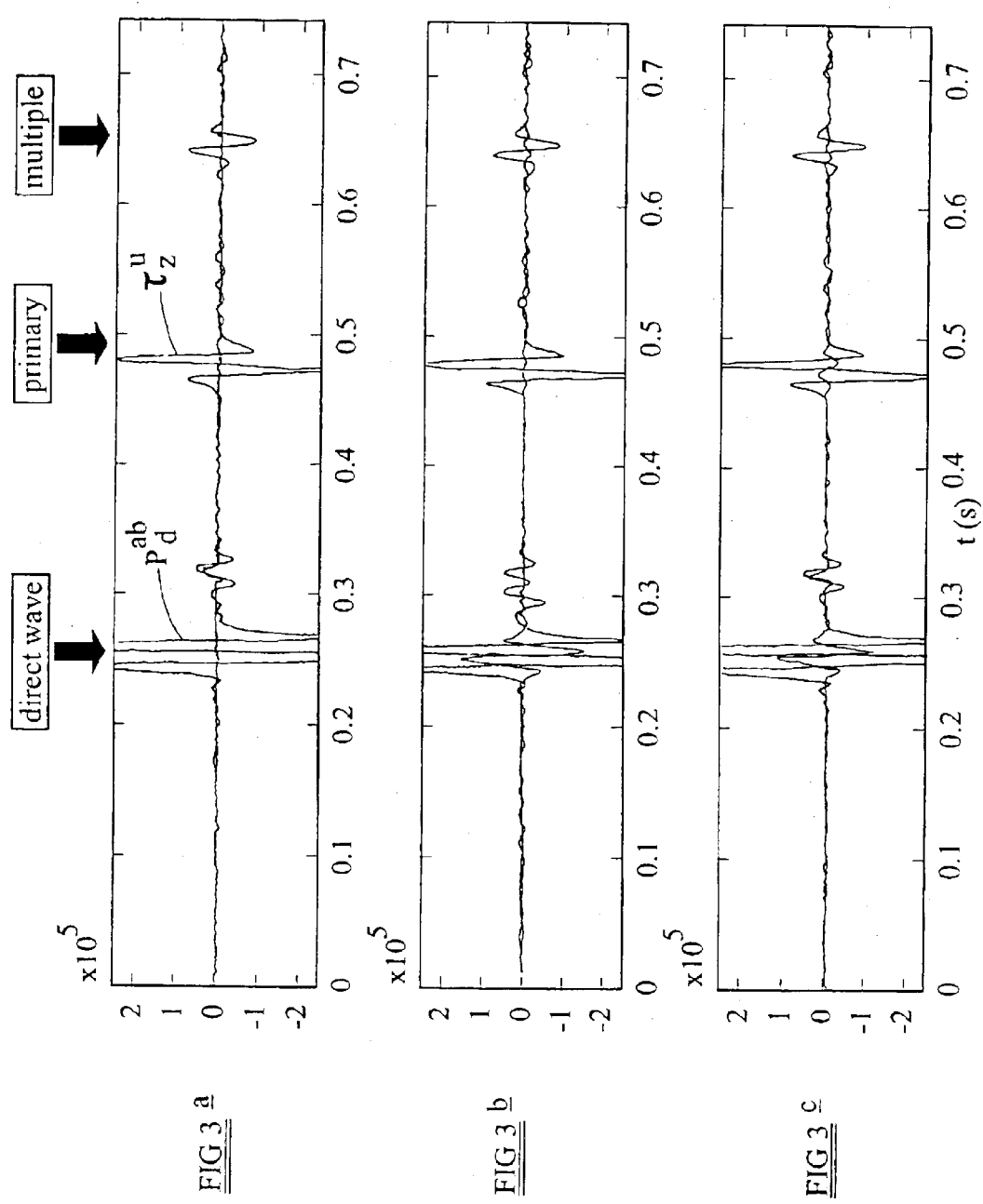

METHOD OF AND APPARATUS FOR PROCESSING SEISMIC DATA

BACKGROUND OF THE INVENTION

1. Field of the Invention

This present invention relates to a method of processing seismic data, in particular to a method of processing multi-component marine seismic data in order to estimate properties of the seafloor and sensor calibration filters. It also relates to an apparatus for processing seismic data.

2. Description of the Related Art

FIG. 1 is a schematic illustration of one marine seismic surveying arrangement. In this arrangement, a seismic source 1 is towed through a water layer (in this case the sea) by a survey vessel 2, and is caused to emit discrete pulses of seismic energy. The surveying arrangement includes a seismic sensor 3, generally known as a "receiver", for detecting seismic energy emitted by the source 1. In FIG. 1 the receiver 3 is disposed on the sea-bed. (A practical seismic surveying arrangement will generally include an array of more than one receiver; for example, in an Ocean Bottom Cable survey a plurality of receivers are attached to a support cable and the cable is then deployed on the sea-bed. However, the principles of a marine seismic surveying arrangement will be explained with reference to only one receiver, for ease of explanation.)

Seismic energy may travel from the source 1 to the receiver 3 along many paths. For example, seismic energy may travel direct from the source 1 to the receiver 3, and this path is shown as path 4 in FIG. 1. Path 4 is known as the "direct path", and seismic energy that travels along the direct path 4 is known as the "direct wave".

Another path of seismic energy from the source 1 to the receiver 3 involves a single reflection at a reflector 7 disposed within the earth, and this is shown as path 5 in FIG. 1. (This path will also involve refraction at the sea-floor and at interfaces between different layers within the earth, but this has been omitted for clarity.) This path is known as the "primary path", and seismic energy received at the receiver 3 along this path is known as the "primary reflection". Only one reflector is shown in FIG. 1, but typical seismic data will contain primary reflections from many different reflectors within the earth.

Not all downwardly-propagating seismic energy that is incident on the sea-bed will pass into the earth's interior, and a proportion will be reflected upwards back into the sea. Furthermore, the source 1 may emit some upwardly-propagating seismic energy which will reach the receiver after undergoing reflection at the sea-surface. These effects give rise to seismic energy paths, for example such as paths 6a and 6b in FIG. 1, that involve more than pass through the water. These paths are known as "water layer multiple" paths.

The existence of many paths from the source 1 to the receiver 3 in a seismic surveying arrangement of the general type shown in FIG. 1 complicates analysis of seismic data acquired by the receiver 3. When seismic data acquired by the receiver 3 are analysed, it is necessary to distinguish events arising from a primary reflection, events arising from the direct wave and events arising from a water-layer multiple. In deep water there is generally a significant time delay between an event arising from the direct wave and an event arising from a water-layer multiple, but in shallow water an event arising from a water-layer multiple may occur very shortly after an event arising from the direct wave.

A further factor that complicates the analysis of seismic data acquired by the receiver 3 is that the properties of the earth are not uniform. In particular, there is frequently a layer 8 at or near the surface whose properties may well be significantly different from the properties of the underlying geological structure 9 (hereinafter referred to as the "basement"). This can occur if, for example, there is a layer at or near the earth's surface that is less consolidated than the basement. In particular, the velocity of seismic energy may be significantly lower in the surface or near-surface layer 8 than in the basement 9, and such a surface or near-surface layer is thus generally known as a "low-velocity layer" (or LVL). This difference in velocity will produce a shift in the travel time of seismic energy compared to the travel time that would be recorded if the surface or near-surface layer and the basement had identical seismic properties, and these shifts in travel time are generally known as "static shifts", or just "statics".

The static shift generated by a surface or near-surface low-velocity layer 8 depends on the thickness of the layer, and on the velocity of propagation of seismic energy through the layer. Lateral variations usually occur in both the thickness of a low-velocity layer 5 and the propagation velocity through the layer, so that the static shift observed at a seismic receiver at one location is likely to be different from the static shift observed at a receiver at another location. To a first approximation, the entire data set recorded at one receiver will be advanced or delayed by a static time shift relative to data recorded at another receiver.

The receiver 3 may measure only a single component of the received seismic energy. Recently, however, it has become common for the receiver 3 to record more than one component of the received seismic energy; for example, the receiver may record the x-, y- and z-components of the particle velocity and the pressure (which is a scalar quantity). interest in acquisition of multi-component seabed seismic data has increased significantly. Since multi-component seabed recordings record shear waves (S-waves), as well as P-waves, it is possible to image through sequences that are opaque to P-waves (e.g. gas-clouds). Moreover, since shear waves reveal the presence of anisotropy more clearly than P-waves, multi-component recordings can yield additional information about the physical properties of the subsurface or about the presence and orientation of small-scale fractures for instance.

Multi-component seismic data can be processed to give information about various seismic parameters, or can be separated into an up-going wavefield and a down-going wavefield. One problem encountered in processing multi-component seismic data is that incorrect sensor calibration can lead to one component of the recorded data being recorded less accurately than the other components. For example, where the receivers are mounted on a support cable, the component of particle velocity in the in-line direction (parallel to the cable) may be recorded more accurately than the component of particle velocity in the cross-line direction (perpendicular to the cable). This problem is known as "vector infidelity".

There have been a number of proposals for filters that allow decomposition of multi-component seabed seismic data, for example by Amundsen, L. and Reitan, A., in "Decomposition of multi-component sea-floor data into up-going and down-going P and S-waves", *Geophysics*, Vol. 60, No. 2, 563–572 (1995), by Wapenaar, C.P.A et al in "Decomposition of multi-component seismic data into primary P- and S-wave responses", *Geophys. Prosp.*, Vol. 38, 633–661 (1990), and by Amundsen, L et al, in "Multiple attenuation and P/S splitting of multi-component OBC data at a heterogeneous sea floor", *Wave Motion*, vol 32, 67–78 (2000) and in "Decomposition of multi-component sea-floor data into up-going and down-going P- and S-waves", *Geophysics*, Vol. 60, No. 2, 563–572 (2000). However, these filters rely on the assumption that the data input to these schemes are a good vector representation of the actual seismic signal acquired at the receiver, and they also require knowledge of the elastic properties of the seafloor, For this reason, the issues of wavefield decomposition, statics estimation and vector fidelity are intrinsically coupled.

Knowledge of the properties of the surface layer 8 is required in a number of processing steps for multi-component seabed seismic data. These include wavefield separation, statics estimation and removal, noise attenuation and removal of water layer reverberations. Amundsen, L. and Reitan, A. have proposed, in "Estimation of seafloor wave velocities and density from pressure and particle velocity by AVO analysis", *Geophysics*, Vol. 60, No. 5, 1575–1578 (1995), estimating the P- and S-wave velocities as well as the density of the surface layer 8 through AVO analysis of the sea-floor reflection coefficient. The P-wave velocity of the surface layer 8 can further be obtained from, for example, analysis of refracted waves. Their technique, however, does not address incorrect sensor calibration. Moreover, the accuracy of the S-wave velocity estimate is limited and can only be obtained if far-offset data is included in the inversion. Alternatively, the P-wave velocity can be obtained from analysis of refracted waves.

A method of estimating the surface layer shear velocity by means of inversion of phase-velocity of Scholte waves has been developed by Muyzert, E., in "Scholte wave inversion for a near-surface S-velocity model and PS-statics", $70^{th}$ Ann. Internat. Mtg. Soc. Expl. Geophys., 1197–1200 (2000). Satisfactory results have been reported for this method, for both synthetic data and field data. Its main application is for estimating PS-statics, although the S-wave velocity estimate could in principle be used for wavefield decomposition as well. However, the technique typically operates at temporal frequencies that are much lower than the typical bandwidth used in a seismic reflection survey. Therefore, it is not clear whether this technique yields estimates of the surface layer properties that can be used directly as input for the decomposition schemes.

One possible strategy to tackle the above problem has been put forward by Schalkwijk et al, in "Application of two-step decomposition to multi-component ocean-bottom data, theory and case study", *Journ. of Seism.* Expl. 8, 261–278 (1999). The main principle of this method, generally known as the "Delft two-step decomposition scheme", is to divide the decomposition procedure into a number of smaller steps. The required information (elastic properties of the surface layer and sensor calibration) can then be obtained by imposing geophysical constraints on the intermediate decomposed results. Although this approach allows for an elastic decomposition without any a priori information about the subsurface, it requires considerable interpretation of the recorded data in advance—in particular it requires the prior identification of different events in the seismic data. Moreover, the identification of the desired arrivals can be particularly troublesome for some data, for example data recorded in shallow seas. This approach is, therefore, rather time-consuming and unsuitable for real-time processing applications.

U.S. Pat. No. 5,621,700 proposes directly comparing recordings of pressure and vertical component of particle velocity at each sensor package. Up-going waves could then be identified by identical polarities, whereas opposite polarities would characterise down-going energy (direct wave and water layer reverberations). Although the method may be unsuitable for many applications, good images have been obtained in some cases.

SUMMARY OF THE INVENTION

The present invention seeks to provide a method for estimating the elastic properties of the surface layer and the sensor calibration operators without the requirement of a prior step of data interpretation.

The present invention provides a method of processing multi-component seismic data acquired at a receiver, the method comprising the steps of:

a) decomposing a first portion of the seismic data into a plurality of wavefield components using a first decomposition scheme;

b) selecting first and second wavefield components that should not have arrived simultaneously at the receiver; and c) multiplying the first wavefield component by the second wavefield component.

Since the first and second wavefield components should not arrive simultaneously at the receiver, the result of step (c) should be zero if the decomposition scheme is accurate. Step (c) thus serves to check the accuracy of the decomposition scheme used, Alternatively, the invention can be used to determine the most accurate decomposition scheme, by finding the decomposition scheme that minimises the absolute value of the result of step (c).

In a preferred embodiment the method further comprises the step (d) of adjusting one or more parameters of the decomposition scheme on the basis of the result of step (c). If the result of step (c) shows that the initial decomposition scheme was inaccurate, it is possible to adjust one or more parameters of the decomposition scheme that relate, for example, to the properties of the surface layer or to the calibration of the components of the receiver. The adjusted decomposition scheme can then be checked for accuracy and, if necessary, further adjustments can be made until a satisfactory decomposition scheme is reached (i.e., until a decomposition scheme that minimises the absolute value of the result of step (c) is found).

In an alternative preferred embodiment the method further comprises the steps of:

e) decomposing the first portion of the seismic data into a plurality of wavefield components using a second decomposition scheme;

f) multiplying the first selected wavefield component obtained in step (e) by the second selected wavefield component obtained in step (e); and g) comparing the result of step (c) with the result of step (h).

The first embodiment provides an iterative method for adjusting the parameters of an initial decomposition scheme until it gives satisfactory results. In the second embodiment, in contrast, the seismic data are decomposed using two (or more) different decomposition schemes and the most accurate of the schemes is selected.

A second aspect of the invention provides an apparatus for processing multi-component seismic data acquired at a receiver, the apparatus comprising:

a) means for decomposing a first portion of the seismic data into a plurality of wavefield components using a first decomposition scheme;

b) means for selecting first and second wavefield components that should not have arrived simultaneously at the receiver; and c) means for multiplying the first wavefield component by the second wavefield component

BRIEF DESCRIPTION OF THE DRAWINGS

Preferred embodiments of the examples will now be described by way of illustrative examples, with reference to the accompanying Figures in which:

FIG. 3(a) illustrates typical results for the down-going pressure above the seabed and the up-going normal fraction below the seabed;

FIG. 3(b) shows results corresponding to FIG. 3(a) but for one simulation of inaccurate sensor calibration;

FIG. 3(c) shows results corresponding to FIG. 3(a) but for another simulation of inaccurate sensor calibration;

DETAILED DESCRIPTION

Figure 1:
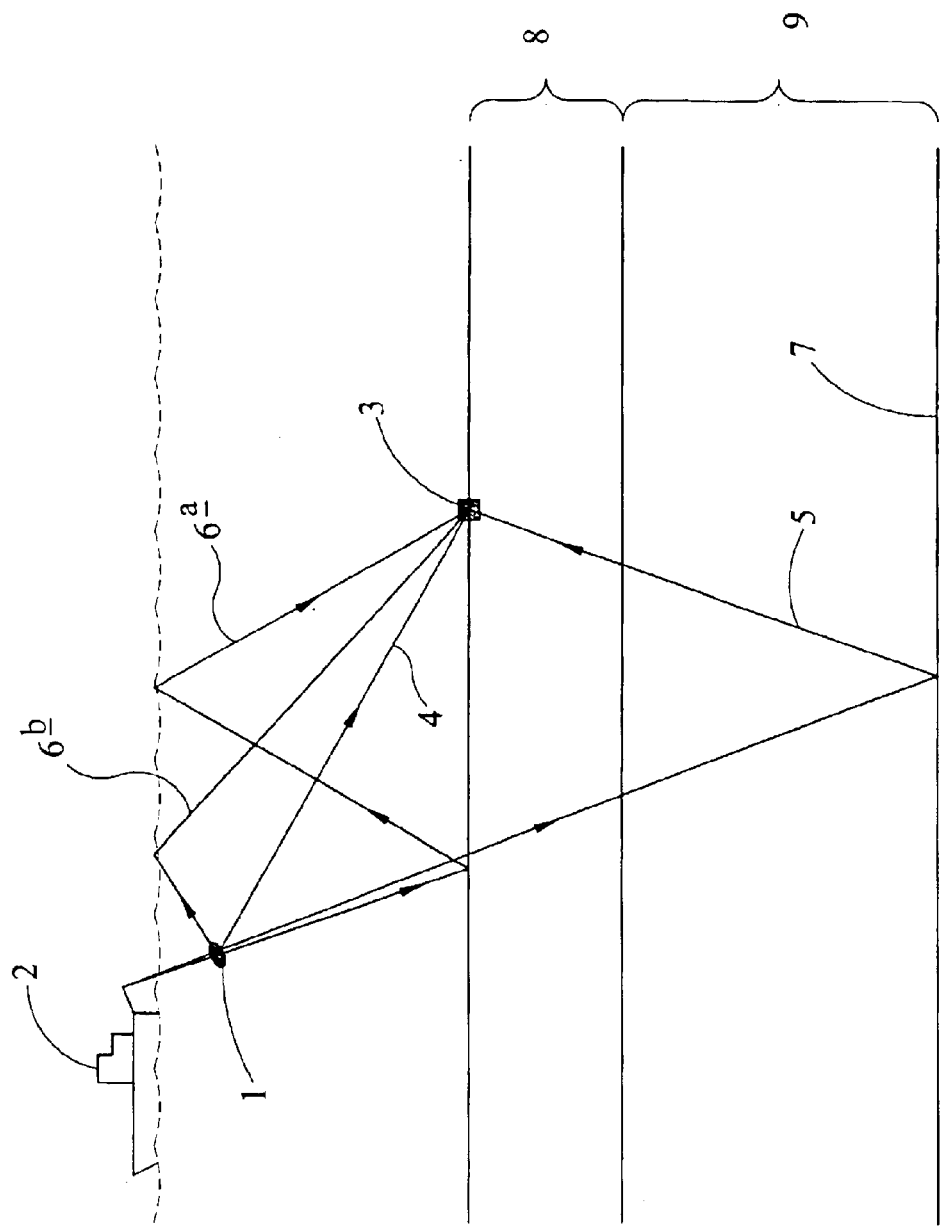
FIG. 1 is a schematic view of a marine seismic surveying arrangement.

As noted above, the Delft two-step decomposition scheme proposed by Schalkwijk et al attempts to eliminate the need for a priori information on the sensor calibration and the surface layer properties by applying geophysical constraints to intermediate decomposition results. Examples of suitable constraints include:

No down-going pressure above the seafloor ($P_d^{ab}=0$) for primary reflections;

No up-going normal stress below the seafloor ($tau_{xz,u}^{bel}=0$) for the direct wave and for water layer multiples;

No up- or down-going shear stresses below the seafloor ($tau_{xz,u}^{bel}$, $tau_{xz,d}^{bel}=0$) for the direct wave.

In the notation used for these symbols, P indicates pressure, $tau_{zz}$ indicates normal stress, $tau_{xz}$ indicates shear stress, the superscripts "ab" and "bel" denote above and below the seabed, and the subscripts "u" and "d" denote up-going and down-going. Frequency wavenumber expressions for the filters required to calculate the wavefield constituents $P_d^{ab}$, $tau_{zz,u}^{bel}$, $tau_{xz,u}^{bel}$ and $tau_{xz,d}^{bel}$ can be found in Schalkwijk et al, 1999, supra.

In order to apply the above constraints, the recorded data needs to be analysed before processing so as to identify the direct wave, the water layer multiples and the primary reflections. Subsequently, data-windows can be selected over which to execute the optimisation procedure for the above criteria, thus turning the decomposition scheme into an iterative process. This approach is reasonably successful for data acquired in deep-water, since such data typically have a large time-interval between the arrival of the direct wave and the arrival of the first water layer multiple. All energy in the time-window between the arrival of the direct wave and the arrival of the first water layer multiple event can then be regarded as up-going signals reflected from subsurface structures. In the case of data acquired in a shallow sea, however, water layer multiples will arrive relatively soon after the direct wave, thus complicating a classification of events in the seismic data into primary reflections and water layer multiples.

The principle of the present invention is to find combinations of wavefield constituents for which the energy generally does not arrive simultaneously at a receiver location. If there is no direct physical coupling between two wavefield components, so that the two wavefield components do not arrive at a receiver location at the same time, the product of the two components at that location will be zero. The accuracy of a decomposition scheme may therefore be checked by decomposing an acquired wavefield into its components and cross-multiplying two wavefield components, obtained by the decomposition, that should not have arrived at the receiver at the same time (for brevity, two such components will hereinafter be referred to as "uncoupled wavefield components"). If the decomposition was performed accurately, the result of cross-multiplying two uncoupled wavefield components should be close to zero. Straightforward cross-multiplication of these wavefield constituents provides a measure for the leakage of energy between the components due to imperfect wavefield decomposition, and thus provides a measure of the accuracy of the wavefield decomposition. Crossing events may exist, but their contribution to the product of the two uncoupled wavefield components may be statistically reduced by choosing a sufficiently large time-space window.

In particular, the present invention provides a method for determining the correct elastic properties of the seabed and the sensor calibration. The method involves developing an initial decomposition scheme on the basis of estimated elastic properties of the surface layer and on the basis of an initial assumed sensor calibration. The seismic data are decomposed using this initial decomposition scheme, and two components of the decomposed wavefield that should be uncoupled wavefield components are selected and cross-multiplied. The results of the cross-multiplication provide [[s]] an indication of the accuracy of the initial decomposition scheme. If the results of the cross-multiplication show that the initial decomposition scheme was inaccurate, one or more parameters of the decomposition scheme are adjusted. For example, the elastic properties of the surface layer used in the decomposition scheme may be changed. Alternatively, or additionally, the sensor calibration may be changed. The data are then decomposed using the new decomposition scheme, and the accuracy is again checked by selecting and cross-multiplying two components of the decomposed wavefield that should be uncoupled wavefield components. This process may be repeated as necessary, until an acceptable decomposition scheme is obtained. Thus, the invention makes possible an accurate estimation of both seafloor parameters and sensor calibration operators.

In principle, the process of decomposing the data, selecting and cross-multiplying two components of the decomposed wavefield, and varying parameters of the decomposition scheme can be carried out on the complete set of seismic data. To reduce the computational power required, however, it may be preferable to carry out the process on a subset, such as a selected test portion, of the seismic data. Once a satisfactory decomposition scheme has been obtained by the iterative process outlined above, it can then be used to process all or part of the seismic data. The method of the invention can be applied to newly-acquired seismic data, or to pre-existing seismic data.

Once an acceptable decomposition scheme has been obtained, the parameters of that decomposition scheme may be stored for future use. Alternatively or additionally the parameters may be output to an operator.

In a further preferred embodiment of the invention, the accuracy of the decomposition scheme is checked using more than one pair of uncoupled wavefield components. A combined function of two or more pairs of selected uncoupled wavefield components is generated, and an acceptable decomposition scheme (ie, a scheme for which the combined function is close to zero) is determined.

Examples of possible combinations of wavefield components that do not arrive at a receiver at the same time include:

a) down-going pressure above the seafloor ($P_d^{ab}$), up-going normal stress below the seafloor($tau_{zz,u}^{bel}$);
b) down-going pressure above the seafloor($P_d^{ab}$), up-going shear stress below the seafloor($tau_{xz,u}^{bel}$);
c) up-going normal stress below the seafloor($tau_{zz,u}^{bel}$), up-going shear stress below the seafloor ($tau_{xz,u}^{bel}$);
d) up-going P-waves below the seafloor($\phi_u^{bel}$), up-going S-waves below the seafloor ($\psi_u^{bel}$);
e) down-going pressure above the seafloor ($P_d^{ab}$), up-going P-waves below the seafloor ($\phi_u^{bel}$); and
f) down-going pressure above the seafloor($P_d^{ab}$), up-going S-waves below the seafloor ($\psi_u^{bel}$).

Figure 2:
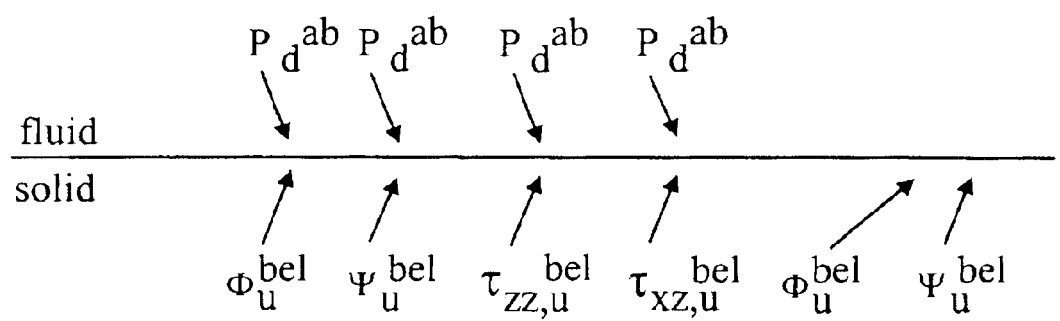
FIG. 2 illustrates pairs of wavefield constituents suitable for use in a method of the present invention.

Some of these pairs of independent wavefield constituents are shown diagrammatically in FIG. 2. In FIG. 2, $\phi_u^{bel}$ and $\psi_u^{bel}$ are the up-going P- and S-waves below the seafloor.

In preferred embodiments of the invention, the step of cross-multiplying one or more pairs of wavefield components comprises determining one or more of the following energy functions:

$$E_1 = \sum_{i=1}^{Nt} \sum_{j=1}^{Nx} (P_d^{ab}(i, j) \cdot tau_{xz,u}^{bel}(i, j))^2$$

$$E_2 = \sum_{i=1}^{Nt} \sum_{j=1}^{Nx} (P_d^{ab}(i, j) \cdot tau_{xz,u}^{bel}(i, j))^2$$

$$E_3 = \sum_{i=1}^{Nt} \sum_{j=1}^{Nx} (tau_{xz,u}^{bel}(i, j), tau_{xz,u}^{bel}(i, j))^2$$

$$E_4 = \sum_{i=1}^{Nt} \sum_{j=1}^{Nx} (\Phi_u^{bel}(i, j) \cdot \Psi_u^{bel}(i, j))^2$$

$$E_5 = \sum_{i=1}^{Nt} \sum_{j=1}^{Nx} (\Phi_u^{bel}(i, j) \cdot P_d^{ab}(i, j))^2$$

$$E_6 = \sum_{i=1}^{Nt} \sum_{j=1}^{Nx} (\Psi_u^{bel}(i, j) \cdot P_d^{ab}(i, j))^2, \text{ or, in general terms}$$

$$E = \sum_{i=1}^{Nt} \sum_{j=1}^{Nx} (\alpha(i, j) \cdot \beta(i, j))^2$$

where $\alpha$ (i,j) and $\beta$ (i,j) are two uncoupled wavefield components.

In these energy functions, the sum over i is a sum over time samples, and Nt is the number of time samples used for the inversion. The sum over j is a sum over traces, offsets or receivers, and Nx is the number of traces, offsets or receivers used for the inversion.

It should be noted that these energy functions use the same wavefield constituents as used in the Delft two-step decomposition scheme, and the filter expressions required to calculate these constituents can be found in Schalkwijk et al, 1999 (supra), However, the energy functions given above consist of straightforward products of different wavefield constituents only, so that the need for a prior analysis step to identify arrivals in the data is eliminated. The energy functions of the present invention can be computed for arbitrary time intervals.

The invention will now be illustrated by means of an example using synthetic seismic data. For this example, a reflectivity code was used to generate synthetic seismic data for a canonical 1 D-earth model. The synthetic seismic data was then decomposed to give the wavefield components $P_d^{ab}$ and $tau_{zz,}^{ubel}$. These wavefield components were obtained using the filters proposed by Schalkwijk et al.

FIG. 3(a) shows the results for $P_d^{ab}$ and $tau_{zz,u}^{bel}$ obtained when the correct sensor calibration and correct seafloor properties are used to generate the decomposition filters. FIG. 3(a) shows a time-window containing three arrivals: the direct wave, a primary reflection and a water layer multiple. It can be seen that, in general, $tau_{zz,u}^{bel}$ is substantially zero when $P_d^{ab}$ is non-zero, and vice versa. It will also be seen that the optimisation criteria (1) ($P_d^{ab}$=0 for primary reflections) and (2) ($tau_{zz,u}^{bel}$=0 for the direct wave and for water layer multiples) above are generally well satisfied.

FIG. 3(b) shows the decomposed results obtained when the P-wave velocity used in the decomposition deviates by 10% from the correct value. This simulates the effect on the decomposition of the use of incorrect elastic properties for the sea-bed. It will be noted that $P_d^{ab}$ and $tau_{zz,u}^{bel}$ are both non-zero for the direct wave, so that the optimisation criterion (2) ($tau_{zz,u}^{bel}$=0 for the direct wave and for water layer multiples) above is clearly not satisfied.

Finally, FIG. 3(c) shows decomposed results obtained when the vertical component of the received particle velocity is scaled by a factor 1.2 before performing the decomposition. This simulates the effect on the decomposition of incorrect sensor calibration. It will be noted that $P_d^{ab}$ and $tau_{zz,u}^{bel}$ are both non-zero for the direct wave and the primary reflection, so that the optimisation criteria (1) ($P_d^{ab}$=0 for primary reflections) and (2) ($tau_{zz,u}^{bel}$=0 for the direct wave and for water layer multiples) above are clearly not satisfied.

FIGS. 3(a) to 3(c) illustrate that an elastic decomposition performed with incorrect seafloor properties or with improperly calibrated sensors will results in leakage of energy between the different wavefield constituents. This phenomenon is easily recognised in FIGS. 3(b) and 3(c) as simultaneously arriving energy in the down-going pressure above the seafloor and the up-going normal stresses below the seafloor. The present invention is able to quantify this leakage of energy between the different wavefield constituents, under the assumption that the up- and down-going wavefield constituents largely do not arrive at the same time. The invention hence provides an indication as to whether the decomposition scheme is satisfactory. Clearly cross-multiplying $P_d^{ab}$ and $tau_{zz,u}^{bel}$ over the trace in FIG. 3(a) will produce a value close to zero, since $P_d^{ab}$ is generally non-zero only when $tau_{zz,u}^{bel}$ is close to zero and vice versa.

However, cross-multiplying $P_d^{ab}$ and $tau_{zz,u}^{bel}$ over the trace in FIG. 3(b) or FIG. 3(c) will produce a much larger value, since there are times in the traces where $P_d^{ab}$ and $tau_{zz,u}^{bel}$ are both substantially non-zero.

Thus, cross-multiplying $P_d^{ab}$ and $tau_{zz,u}^{bel}$ provides a measure of the accuracy of the decomposition of FIGS. 3(a) to 3(c), and hence provides a measure of the accuracy of the assumptions underlying the decomposition scheme. The most accurate decomposition scheme can be found by adjusting the parameters underlying the decomposition scheme until the result of cross-multiplying $P_d^{ab}$ and $tau_{zz,u}^{bel}$ becomes a minimum.

Figure 4A:
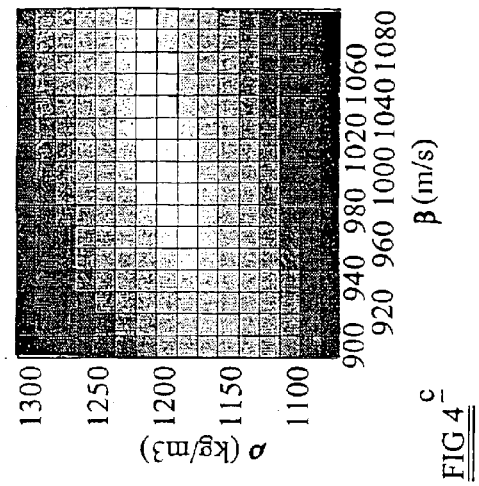
FIGS. 4(a) to 4(d) show cross-sections through energy functions calculated by a method of the invention.

FIG. 4(a) shows a cross-section through energy function $E_1$ as function of the P-wave velocity in the seabed ($\alpha$, along x-axis) and the density of the surface layer of the seabed ($\rho$, along y-axis). The value of the energy function $E_1$ is show on a logarithmic scale, with lighter areas of FIG. 4(a) corresponding to lower values for $E_1$. This figure shows that the values of the seafloor seismic velocities are remarkably well constrained, particularly the P-wave velocity.

Figure 4B:
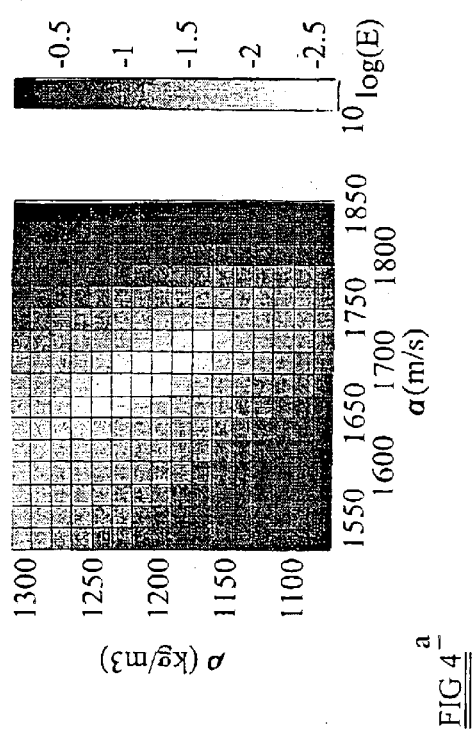
Figure 4C:
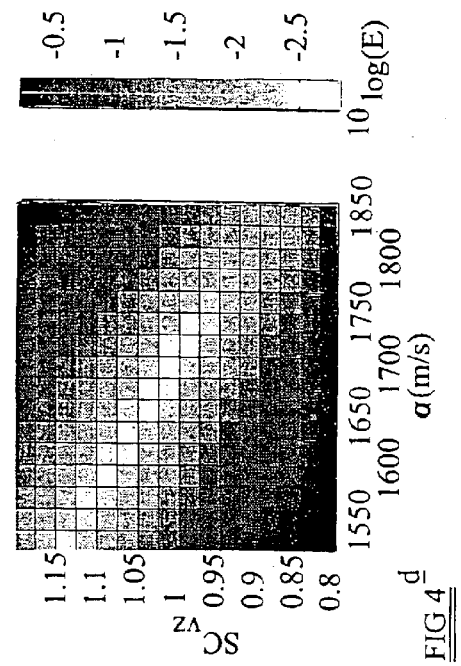

FIGS. 4(b) and 4(c) show the energy function $E_1$ as a function of other variables. FIG. 4(b) shows a cross-section through the energy function $E_1$ as function of the P-wave velocity in the seabed (x-axis) and the S-wave velocity hi the seabed ($\beta$, along the y-axis). FIG. 4(c) shows a cross-section through energy function $E_1$ as function of the S-wave velocity in the seabed ($\beta$, along x-axis) and the density of the surface layer of the sea-bed (y-axis).

Figure 4D:
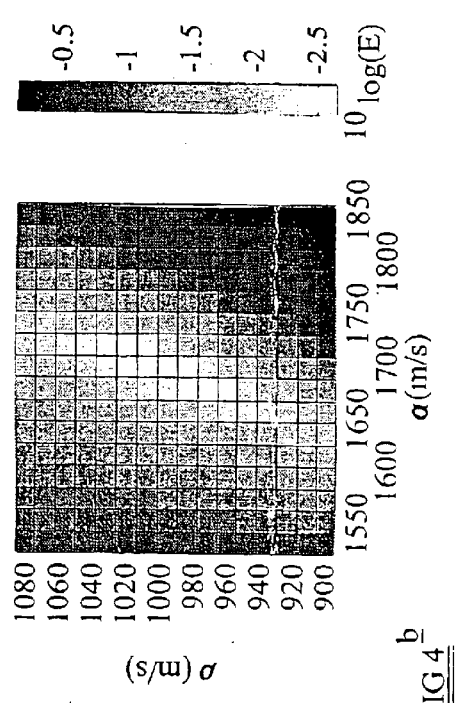

FIG. 4(d) shows a cross-section through $E_1$ as function of the P-wave velocity (x-axis) and a scalar calibration factor ($sc_{vz}$, y-axis) applied to the vertical component of particle velocity. The energy function is computed using a vertical velocity component $v_z$ that has been multiplied by the scalar factor, to simulate improperly calibrated sensors.

It will be seen that $E_1$ shows a minimum in each of FIGS. 4(a) to 4(d). In the case of FIG. 4(d), the minimum value occurs, as is expected, at $sc_{vz}=0$.

FIGS. 4(a) to 4(d) illustrate the effect that varying parameters underlying the decomposition scheme have on the energy function $E_1$. Similar effects will be observed for other energy functions, for example on the energy functions $E_2$ to $E_6$ above. In a preferred embodiment of the invention, therefore, a simultaneous minimisation of more than one energy function is made. For example, two (or more) of the energy functions $E_1$ to $E_6$ given above could be summed to give a combined energy function of the form: $E_{tot}=E_m+E_n$ (where m≠n). The decomposition scheme that minimises $E_{tot}$ may then be found, in a similar manner to that described above for a single energy function.

The combined energy function is not limited to a summation of two or more of the energy functions $E_1$ to $E_6$ listed above, but may be formed by summing any two (or more) suitable energy functions. For example, $E_{tot}$ may alternatively be produced by summing two (or more) energy functions having the general form of the energy function E' given below.

In a further embodiment, $E_{tot}$ is determined using a weighted summation.

With an eye on the development of computationally more efficient implementations of the wavefield decomposition filters, it is anticipated that the method of the invention allows for a real-time tabulation of the elastic properties of the seafloor.

The present invention is not limited to the energy functions of the general form E above. Any function that involves the product of two uncoupled components of the wavefield can in principle be used. For example, an energy function of the following general form could be used:

$$E' = \sum_- x \frac{\sum_- t((\alpha * \beta)^\wedge 2)}{\sum_- t(\alpha^\wedge 2.) * \sum_- t(\beta^\wedge 2)}$$

The numerator of the energy function E' corresponds to the first energy function E. The denominator of the energy function E' scales more or less by the energy present on the traces, and avoids the near-offset traces dominating the optimisation. Larger angles of incidence are required to estimate the P-wave velocity independent from density and to estimate the S-wave velocity more accurately.

In the embodiment described above, an accurate decomposition scheme is obtained by an iterative process starting from an initial estimated scheme. In an alternative embodiment of the invention two or more different decomposition schemes are initially developed, and a test portion of the seismic data is processed using each of the initial decomposition schemes. The results of the decomposition schemes are then checked by determining the result of, for each decomposition scheme, cross-multiplying two selected uncoupled wavefield components (the same two for each decomposition scheme). The most accurate of the decomposition schemes is the scheme for which the result of cross-multiplying the two selected uncoupled wavefield components is closest to zero.

The invention has been described above with respect to the time-space domain. The invention is not limited to the time-space domain, however, and may be carried out in any convenient domain. As an example, the invention may alternatively be carried out in the frequency-wavenumber domain (fk domain). Energy functions such as $E_1$ would then be defined as a convolution over frequency.

In practice, it may be easier to define a suitable window for the optimisation process in the fk domain than in the time-space domain. Moreover, the accuracy of many filter approximations, such as a Taylor expanded filter, decreases with wavenumber. It is possible to compensate for this when optimising the decomposition scheme in the fk domain, since it is possible to apply weighting functions that are dependent on $k_x$ in the summation to determine an energy function.

The invention has been described above with respect to Ocean Bottom seismic data acquired using a receiver disposed on the sea-bed. The invention is not limited to this, however, and may also be applied to seismic data acquired in, for example, a land seismic survey, a towed marine seismic survey, or a borehole seismic survey (ie, a vertical seismic profile survey). For example, the invention may be applied to data acquired in a land seismic survey, using up-coming P-waves and upcoming S-waves as uncoupled components. It should be noted, however, that mode conversion may occur at the lower boundary face of the surface layer 8 if the seismic velocity in the surface layer differs significantly from the seismic velocity in the basement; in this case it may not be possible to treat the up-coming P-waves and upcoming S-waves as uncoupled wavefield components.

Figure 5:
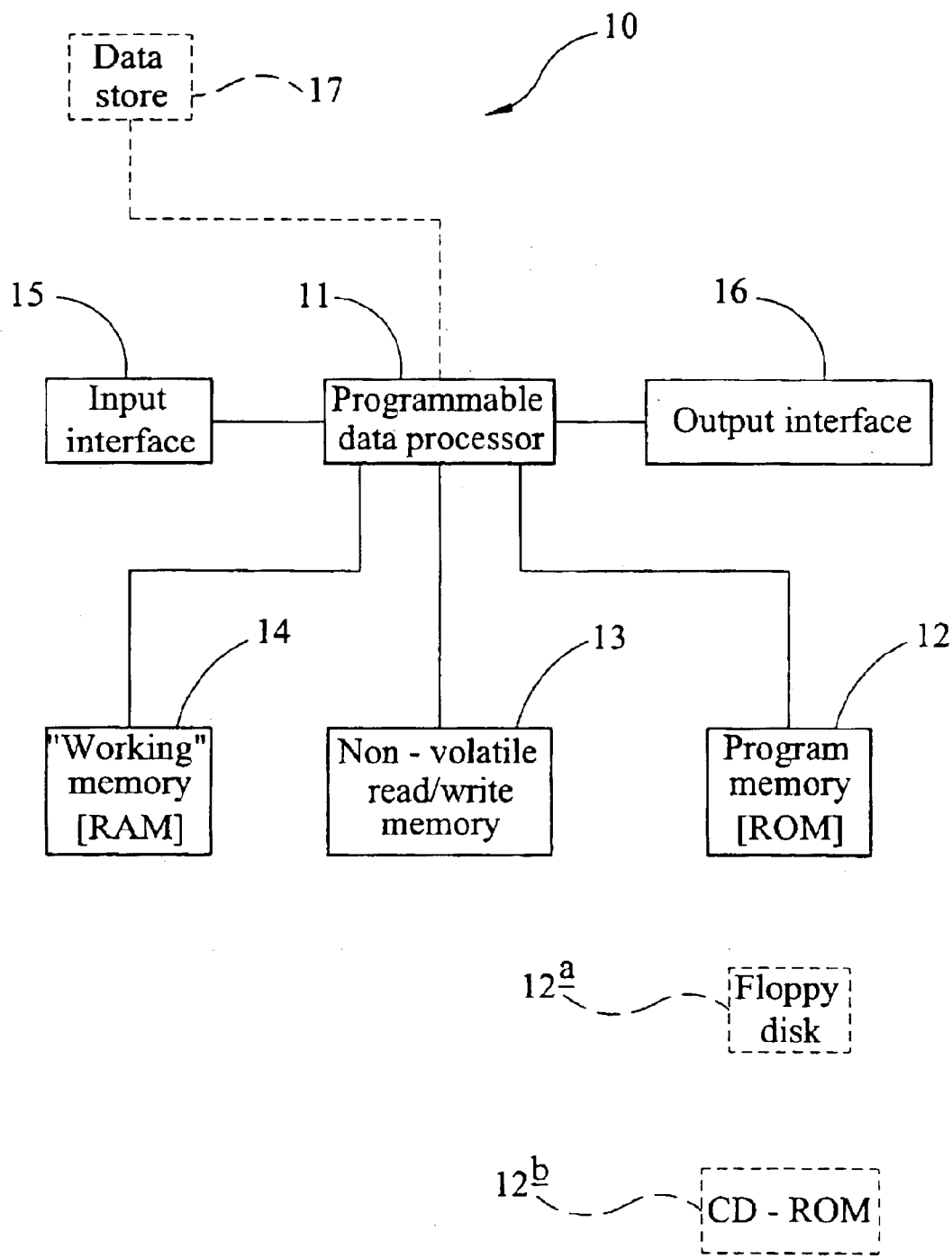
FIG. 5 is a schematic block diagram of an apparatus of the invention.

FIG. 5 is a schematic block diagram of a programmable apparatus 10 according to the present invention. The system comprises a programmable data processor 11 with a program memory 12, for instance in the form of a read only memory ROM, storing a program for controlling the data processor 11 to perform a method according to invention as described above. The system further comprises non-volatile read/write memory 13 for storing, for example, any data which must be retained in the absence of power supply. A "working" or "scratchpad" memory for the data processor is provided by a random access memory (RAM) 14. An input interface 15 is provided, for instance for receiving commands and data. An output interface 16 is provided, for instance for displaying information relating to the progress and result of the method. User-defined data may be supplied via the input Interface 15 or may optionally be provided by a machine-readable store 17.

The program for operating the system and for performing any of the methods described hereinbefore is stored in the program memory 12, which may be embodied as a semiconductor memory, for instance of the well-known ROM type. However, the program may be stored in any other suitable storage medium, such as magnetic data carrier 12a (such as a "floppy disc") or CD-ROM 12b.

What is claimed is:

1. A method of processing multi-component seismic data acquired at a receiver, comprising:
   a) decomposing a first portion of the seismic data into a plurality of wavefield components using a first decomposition scheme;
   b) selecting first and second wavefield components that should not have arrived simultaneously at the receiver; and
   c) multiplying the first wavefield component by the second wavefield component.

2. The method as claimed in claim 1, further comprising (d) of adjusting one or more parameters of the decomposition scheme on the basis of the result of step (c).

3. The method as claimed in claim 1, further comprising (d) adjusting one or more parameters of the decomposition scheme if the result of step (c) is significantly different from zero.

4. The method as claimed in claim 3, further comprising decomposing the first portion of the seismic data into a plurality of wavefield components using the adjusted decomposition scheme.

5. The method as claimed in claim 4, further comprising repeating step (b) and step (c).

6. The method as claimed in claim 1, further comprising:
   e) selecting third and fourth wavefield components that should not have arrived simultaneously at the receiver; and
   f) multiplying the third wavefield component by the fourth wavefield component.

7. The method as claimed in claim 2, further comprising outputting the parameters of the adjusted decomposition scheme.

8. The method as claimed in claim 3, wherein step (d) comprises adjusting a parameter of the decomposition scheme indicative of the seismic properties of a layer at or near the earth's surface.

9. The method as claimed in claim 3, wherein step (d) comprises adjusting a parameter of the decomposition scheme indicative of the receiver calibration.

10. The method as claimed in claim 2, further comprising processing a second portion of the seismic data using the adjusted decomposition scheme.

11. The method as claimed in claim 1, further comprising:
   g) decomposing the first portion of the seismic data into a plurality of wavefield components using a second decomposition scheme;
   h) multiplying the first selected wavefield component obtained in step (g) by the second selected wavefield component obtained in step (g); and
   i) comparing the result of step (c) with the result of step (h).

12. The method as claimed in claim 11, further comprising selecting either the first decomposition scheme or the second decomposition scheme on the basis of the result of step (i).

13. The method as claimed in claim 12, further comprising the step of processing a second portion of the seismic data using the selected decomposition scheme.

14. The method as claimed in claim 6, wherein at least one of step (c) or step (f) comprises computing:

$$E = \sum_{i=1}^{Nt} \sum_{j=1}^{Nx} (\alpha(i,j) \cdot \beta(i,j))^2$$

wherein $\alpha(i,j)$ and $\beta(i,j)$ are the first and second wavefield components, the sum over i is a sum over time samples, Nt is the number of time samples used for the inversion, the sum over j is a sum over traces, offsets, or receivers, Nx is the number of traces, offsets, or receivers used for the inversion, and E is energy.

15. The method as claimed in claim 6, wherein at least one of step (c) or step (f) comprises computing:

$$E' = \sum_{-} x \frac{\sum_{-} t[\alpha(i,j) \cdot * \beta(i,j)]^2)}{\sum_{-} t[\alpha(i,j)]^2 \sum_{-} t[\beta(i,j)]^2)}$$

wherein $\alpha(i,j)$ and $\beta(i,j)$ are the first and second wavefield components.

16. The method as claimed in claim 1, wherein the multi-component seismic data is performed in the frequency-wavenumber domain.

17. An apparatus for processing multi-component seismic data acquired at a receiver, the apparatus comprising:
   a) first decomposition means for decomposing a first portion of the seismic data into a plurality of wavefield components using a first decomposition scheme;
   b) means for selecting first and second wavefield components that should not have arrived simultaneously at the receiver; and
   c) means for multiplying the first wavefield component by the second wavefield component.

18. The apparatus as claimed in claim 17, further comprising (d) means for adjusting one or more parameters of the decomposition scheme on the basis of the result of multiplying the first wavefield component by the second wavefield component.

19. The apparatus as claimed in claim 18, wherein the adjusting means are adapted to adjust one or more parameters of the decomposition scheme if the result of multiplying the first wavefield component by the second wavefield component is significantly different from zero.

20. The apparatus as claimed in claim 19, wherein the first decomposition means are adapted to decompose the first portion of the seismic data into a plurality of wavefield components using the adjusted decomposition scheme.

21. The apparatus as claimed in claim 17, further comprising:
   e) means for selecting third and fourth wavefield components that should not have arrived simultaneously at the receiver; and
   f) means for multiplying the third wavefield component by the fourth wavefield component.

22. The apparatus as claimed in claim 18, further comprising output means for outputting the parameters of the adjusted decomposition scheme.

23. The apparatus as claimed in claim 18, further comprising means for processing a second portion of the seismic data using the adjusted decomposition scheme.

24. The apparatus as claimed in claim 17, further comprising:
   g) second decomposition means for decomposing the first portion of the seismic data into a plurality of wavefield components using a second decomposition scheme;

h) means for multiplying the first selected wavefield component obtained by the second decomposition means by the second selected wavefield component obtained by the second decomposition means; and i) means for comparing the result of multiplying the first wavefield component by the second wavefield component with the result of multiplying the first selected wavefield component obtained by the second decomposition means by the second selected wavefield component obtained by the second decomposition means.

25. The apparatus as claimed in claim 24, further comprising means for selecting either the first decomposition scheme or the second decomposition scheme on the basis of the result of the result from the comparing means.

26. The apparatus as claimed in claim 25, further comprising means for processing a second portion of the seismic data using the selected decomposition scheme.

27. The apparatus as claimed in claim 17, further comprising a programmable data processor.

28. The method of claim 1, wherein the first and second wavefield components in step (b) are selected from the wavefield components obtained in step (a).

29. The apparatus of claim 17, wherein the selecting means comprise means for selecting, from the wavefield components decomposed by the first decomposition means, the first and second wavefield components that should not have arrived simultaneously at the receiver.

\* \* \* \* \*